Nov. 5, 1968  D. P. MILLER  3,409,252
CONTROLLERS
Filed Sept. 19, 1966

INVENTOR.
DON P. MILLER
BY Gordon Reed
ATTORNEY 3,409,252
CONTROLLERS
Don P. Miller, Minneapolis, Minn., assignor, by mesne assignments, to the United States of America as represented by the Administrator of the National Aeronautics and Space Administration
Filed Sept. 19, 1966, Ser. No. 580,365
9 Claims. (Cl. 244—83)

ABSTRACT OF THE DISCLOSURE

A hand controller operable about three respectively perpendicular axes corresponding to the conventional axes of a flight vehicle. Rotary motion of the controller about a particular axis is transmitted mechanically to operate signal generators for actuating appropriate attitude control devices. The controller includes a first T-shaped cross member disposed with one arm coaxial with the first vehicle axis and journalled to the vehicle frame; the cross member is connected by mechanical linkage to operate a signal generator for effecting attitude control about said first axis such as the roll axis. A tubular member is mounted perpendicular to said first member and journalled thereon for rotation about its own axis. The tubular member is connected by mechanical linkage, including a universal joint to operate a signal generator for effecting attitude control in yaw about a second vehicle axis. A hand grip affixed to the end of the tubular member and axially rotatable therewith is also mounted for pivotal movement thereon about an axis perpendicular to the longitudinal axis of the tubular member. Mechanical linkage, including a universal joint at the intersection of said first and second axes, connects the grip to a signal generator for effecting attitude control in pitch about the third vehicle axis. The use of universal joints obviates the need for wires which couple the signal generators with detectors of mechanical movements of the controller and also permits operation of the device without cross coupling effects in operation of the signal generators.

The invention described herein was made in the performance of work under a NASA contract and is subject to the provisions of Section 305 of the National Aeronautics and Space Act of 1958, (72 Stat. 435); U.S.C. 2457.

This invention relates to improvements in controllers wherein a portion of the controller is capable of movement about a plurality of axes respectively perpendicular, relative to a second member such as a supporting frame. Such controller may be termed a rotational controller.

In prior rotational controllers, one arrangement involves a cross gimbal such as in U.S. Patent 2,842,645. In such cross gimbal arrangement as in 2,842,645, one part 28 was rotated relative to a second part 27 and this second part 27 in turn was also rotatable with respect to a third part 10, 11. The third part 10, 11 could be mounted on the frame such as the aircraft. A signal would be developed on relative rotation of the first and second parts 28, 27, and on relative movement of the second and third parts. However, when the first and second parts were relatively moved the signal was developed in the second part, and in order to use this signal, it was necessary to transmit this signal from the second moveable part, in the cross gimbal arrangement, oftentimes by means of wires 36 or the like to the frame of the aircraft for use. Movement supplied to the wires 36 of the patent in the cross gimbal arrangement upon rotation about the second axes for relative movement of the second and third parts would have a bending effect thereon.

If the cross gimbal arrangement included a gyroscope mounted for stabilizing the first part relative to the second and third parts, the effect of bending the wires would react adversely on the gyroscope. Furthermore, such repeated bending would result in fracture of the wires decreasing their reliability.

In the subject arrangement, if we consider that relative movements between the first and second parts and between the second and third parts of the gimbal mounting operate signals pickoffs the invention herein is in mounting all of the pickoffs on the frame such as the frame of the aircraft while permitting operation thereof so that signals may be transmitted from the pickoffs for use. Thus, said pickoffs are free from connections that involve repeated bending during development of the signals.

An object of this invention, therefore, is to provide an improved control arrangement for a controller operable about a plurality of respectively perpendicular axes.

A further object of this invention is to provide a controller operable about a plurality of respectively perpendicular axes for operating two signal generators, each consisting of two relatively movable parts, one mounted within the other.

A further object of this invention is to provide an improved hand controller that provides selection of rotation about two respectively perpendicular axes corresponding to the direction of movement of the manual operator and wherein there is substantially no cross coupling operation between signal generators such as operation of one effecting also operation of the other.

Other objects and features of the invention will be apparent from a consideration of the specification taken in conjunction with the accompanying drawings illustrative of the invention.

In said drawings.

The invention relates to controllers operable about plural, respectively perpendicular axes to effect a control, as by operating, for example, signal pickoffs. The pickoffs are related to each of the axes and the pickoffs have two relatively movable parts, one part of which in each instance is mounted on the frame of vehicle to be controlled. Provisions are included so that rotation about one axis has no mechanical operation cross coupling effect on the other axis. In other words, the controller may be rotated about one axis and while so displaced may be rotated about a second axis and the signal developed due to rotation about the second axis is substantially the same as that resulting if rotation of the controller were effected only about the second axis and not about the first axis. Such pickof develop signals and in accordance therewith torque applying means of an aircraft may be controlled.

Figure 1:
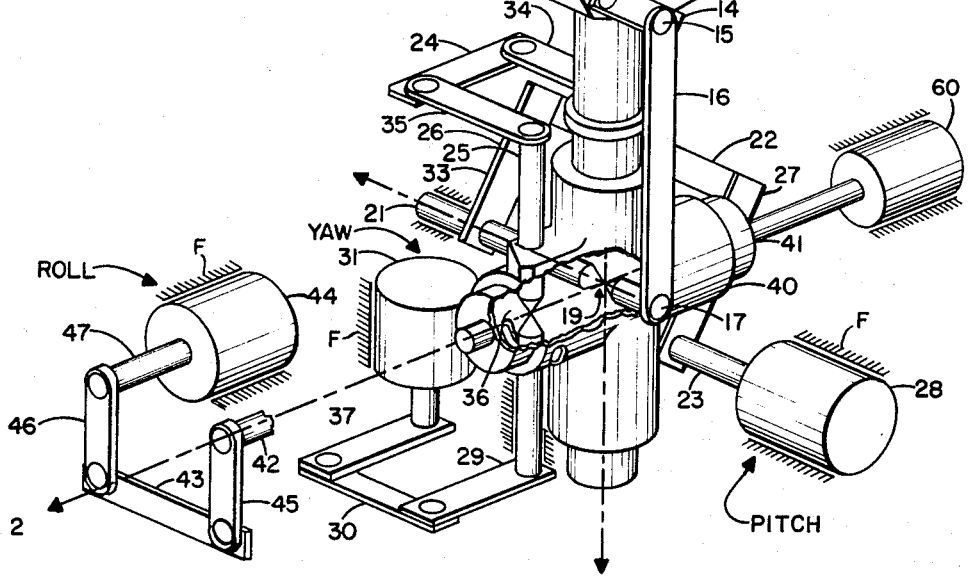
FIGURE 1 is a perspective view of the manually operable, three axis controller.

Referring to FIGURE 1, the invention is embodied in a hand controller 8 operable about three respectively perpendicular axes that correspond in direction with the conventional three axes of an aircraft, for example, so that rotation of the manual controller about one axis will result in rotation of the craft about an axis corresponding with that of the controller. Thus, rotation of the craft corresponds in direction to movement of the operator's hand.

The operation of the manual controller may operate switches that control the reaction jets, however, such operation of a manual controller may also be applied to signal pickoffs that supply signals to an autopilot for controlling an aircraft.

Referring to FIGURE 1, the three axis, manually operable controller 8 includes a hand grip or member 9 mounted on a bonnet 11 with the bonnet being rotatably mounted on a tubular member 10 about one axis 12. Pivoted at one end on bonnet 11 is an arm 14 having its opposite end connected to an arm 16 nonrotatably secured to a shaft 17. Shaft 17, as will be hereinafter described, is connected to one side member of a universal joint 19 for rotation therewith. The opposite side of the universal joint is connected to a shaft 21 journaled in the frame integral with the aircraft, thus shaft 21 is rotatable relative to the frame. The universal joint member 19 is arranged within the tubular member 10 as is more fully shown and described in connection with FIGURE 2. Rotation of shaft 21 is transmitted through an arm 26 fixed thereon, a bridging member 22, secured at one end to arm 26, and at its opposite end to a second arm 27 parallel with arm 26 and integrally carried by shaft 23, the arm 27 as stated being connected at its opposite end to the member 22. The shaft 23 on rotation of bonnet 11 about axis 12 operates for example one part of a two part pickoff or signal means 28, having its other part fixed to the frame F of the aircraft.

The tubular member 10 of the controller is rotatably carried in a T-shaped cross member 40 for rotation about its longitudinal axis. The cross member 40, in turn, is journaled into the frame by its supporting shaft 41 being mounted for rotation in a suitable bearing arrangement 60. The tubular member 10 below the bonnet 11 supports an arm 34 integral therewith connected at its free end to one end of a link 24 having its opposite end connected to an arm 35 rigidly carried by a shaft 25. Shaft 25 is rotatably supported in cross member 40 and at its opposite end drives one end of universal joint 36. The opposite end of universal joint 36 integrally supports one end of an arm 29 pivotally connected at its opposite end to one end of a link 30 having its opposite end pivotally connected to the free end of an arm 37. The opposite end of arm 37 is integrally connected to the movable part of a second two part pickoff 31 or controlled device. The remaining part of the pickoff 31 is on the frame and for an aircraft is considered the yaw control pickoff. The opposite end of the universal joint 36 connected to arm 29 is journaled in the frame.

The cross member 40 for roll control of the aircraft may be mounted for rotation about an axis parallel with the longitudinal axis of the craft. Cross member shaft 40 integrally supports a rod 42 having an arm 45 fixed thereon pivotally connected at its free end to a link 43. Link 43 at its opposite end is pivotally connected to the free end of an arm 46 rigidly carried on an operating shaft 47 of a third two part pickoff 44, having one part rotatable with shaft 47 and the other part fixed with respect to the frame.

It will be understood that the three pickoffs 28, 31, 44, may be of any suitable type and hence may be potentiometer type, inductive type, or capacitive type pickoffs or other control devices such as rotary switches.

Similarly, it will be understood that that hand grip 9 may be biased to a normal position about its three axes of rotation. Controller 8 may be so mounted in the craft that rotation about the axis 12 controls pitch attitude, rotation about the vertical axis controls yaw, and rotation about the axis parallel with the longitudinal axis of the craft controls roll. The biasing may be obtained from scissors type return devices well known in the art wherein an extension of shaft 42 may serve as the input to the roll axis scissors return arrangement; rotation of the tubular member 10 may serve as an input to the yaw scissors return arrangement; and shaft 21 extended may serve as an input to the pitch scissors arrangement. Such scissors type spring operated return arrangements are old in Newland 2,949,262 comprising levers 70, 71 of the drawing. Such arrangement herein comprising an upright plate 64 fixed to the frame and pivotally supporting two levers which at their upper ends have edges abutting opposite sides of a stop 67 fixed to plate 64. Between the lever pivots and stop, the edges also contact on opposite sides a projection 70 from arm 45 for operation therewith. A centering spring 71 connects the levers above their pivot points.

Figure 2:
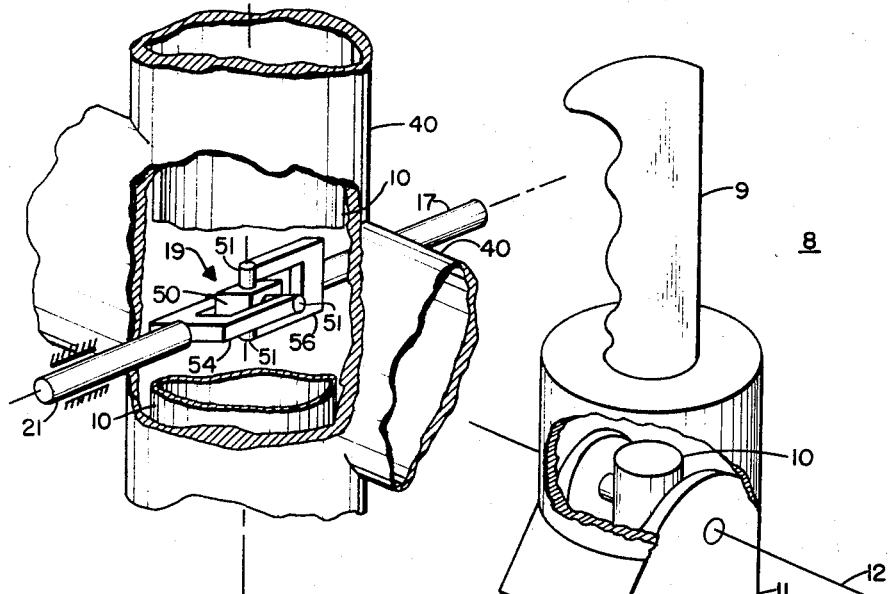
FIGURE 2 shows a detail of the arrangement of a universal joint in the manually operable controller for avoiding mechanical operation cross coupling between axes of the controller.

In FIGURE 2, there are shown details of the universal joint 19. A portion of tubular member 10 that houses universal joint 19 is shown. The universal joint 19 includes essentially a central block member 50, having its geometrical center approximately at the intersection of the yaw axis and roll axis motions of the controller. The central block 50 has a pin 51 extending from each of four faces thereof. A yoke member or one side 56 of the universal joint has one arm thereof journaled on one pin and a second arm thereof journaled on a pin on the opposite face. Yoke 56 is connected to shaft 17.

A second yoke or other side 54 of universal joint 19 has its two side members connected to pins 51 on the opposite faces of block 50, such pins being in a direction at right angles to the direction of the first pair of pins for yoke 56. The yoke 54 is connected to shaft 21. It will be noted that shaft 21 is journaled in the frame. With the universal joint 19 as thus positioned in FIGURE 2, rotation of bonnet 11 on axis 12 will communicate angular movement to shaft 17 which is transmitted through universal joint 19 to shaft 21 which through arm 26, member 22, arm 27, is communicated to pickoff 28 for pitch axis control.

For roll axis control the grip 9, bonnet 11, arms 14, 16, shaft 17, the tube 10 and the cross member 40 are rotated about an axis parallel to the craft longitudinal axis. The horizontal pins on block 50 of universal joint 19, FIGURE 2, to which the yoke 54 is pivotally connected are in the direction of the longitudinal axis and thus permit the relative rotation of yoke 54 relative to block 50 and yoke 56 during roll axis control that operates the pickoff 44 so that no mechanical cross coupling occurs between rotation of cross member 40 and pitch pickoff 28.

Since shaft 21 is journaled on the frame, and since the central block 50 does not rotate with the tubular member 10 at this time, a portion of the tubular member 10 and of cross member 40 has been removed to permit such relative angular movement. Thus, no motion is applied to pickoff 28 during roll axis control angular movements.

The tubular member 10 has portions thereof cut away adjacent shaft 21 to facilitate yaw control operations of the hand grip 9. On the opposite side or adjacent shaft 17, the cross member 40 also has a portion thereof removed to permit relative angular or arcuate movement about the axis of member 10 for yaw control, of the shaft 17 relative to the cross block 40. Thus, for yaw control, rotation of grip 9, the shaft 17, arms 16 and 14, bonnet 11, and tubular member 10 which supports shaft 17 rotate as a group about the longitudinal axis of tubular member 10. Also, the yoke member 56 connected to shaft 17 rotates about an axis in line with the axis of tube 10 provided by the pins 51 of block 50 the movement of the shaft 17 relative to the cross member 40 being permitted by the cut-away opening the wall of member 40. Consequently, during yaw axis control, there is no rotation applied to the shaft 21 and no cross coupling from yaw axis to pitch axis occurs.

In a similar manner, the universal joint 26 is arranged within the cross member 40 so that there is no cross coupling to the roll axis pickoff 44 during either rotation of bonnet 11 about axis 12 for pitch control or rotation of grip 9 and bonnet 11 about the vertical or longitudinal axis of tube 10 for yaw axis control.

It will now be evident from the above that there has been described a novel controller having concepts that may be embodied in a manually operable controller for rotation about three axes corresponding in directions with the normally rectangular axes of an aircraft and that rotations about these three axes may operate suitable signal generators or other devices, wherein the signal generators have one part fixed to the frame so that signals may be directfully connected from such frame mounted part of the pickoff for control purposes. Such arrangements for transmitting the signal does not involve the inclusions of conductors subject to repeated bending action as the control handle 9, during use, is moved for control purposes about any of its three axes of rotation.

The cut-away openings in the wall of the member 40 and the tubular member 10 which provide clearance for angular movement of the shaft 21 relative to the members 40 and 10 during roll and yaw maneuvers may be of any shape sufficient to provide clearance. The opening in the wall of the member 40 to accommodate clearance for relative movement between the shaft 17 and member 40 during a yaw maneuver may also be of any suitable shape.

While but one embodiment of the invention has been shown and described, various changes can be made in the construction of the parts without departing from the spirit and scope of the invention, as the same will now be understood with those skilled in the art.

What is claimed is:

1. A controller operable about three axes for maneuvering a dirigible craft about the three axes thereof, comprising: a base or frame member fixed to the craft; a movable member mounted with respect to the base for angular displacements about three respectively perpendicular axes corresponding to the three axes of the craft; three operable signal means connected to the base for support thereof each operable signal means having a part fixed relative to the base and a movable part connected with an operable means corresponding with an axis of the craft; and means operating any of said movable parts of said three operable means from said member upon angular displacement thereof about any of the respectively perpendicular axes.

2. The apparatus of claim 1 wherein said movable member is provided with a hand grip for manual operation about said three axes with said axes corresponding in direction to the axes of the craft.

3. The apparatus of claim 2, and means for biasing said hand grip to a normal position upon displacement of the member about any of its axes.

4. The apparatus of claim 1 wherein said operable means control electric circuits by which torque applying means about any of the three axes of the craft may be controlled.

5. In a controller operable about a plurality of axes having directions that are respectively perpendicular: a first member journaled for rotation about a first axes; a second member journaled for rotation relative to the first member about a second axis; a universal joint having the geometrical center thereof at substantially the intersection of the first and second axes; a further member rotatably relative supported to the second member for rotation about a third axis, connected to one side of the universal joint; an operable means connected to the other side of the universal joint, and said first member and second member being configured to enable rotation jointly of the first member and second member about the first axis but rotatable movement of the further member relative to the second member is solely transmitted to the operable means.

6. The apparatus of claim 5 wherein the operable means connected to the other side of the universal joint comprises a shaft journaled in a frame common to that for rotatably supporting the first member.

7. The apparatus of claim 5, a second universal joint within said first member having one side thereof connected to the second member for operation during rotation about the second axis and its opposite side connected to a second operable means said second universal joint being arranged so that the second operable means responds only to rotation about the second axis despite rotation of the second member also about the first axis.

8. The apparatus of claim 7, wherein the directions of the three axes correspond with the directions of three axes of an aircraft.

9. In a manually operable controller operable about a plurality of axes having directions that are respectfully perpendicular, a first rotatable member; a second rotatable member rotatably supporting the first member for rotation about a first axis; means for supporting the second member for rotation about a second axis; a first two part operable means; a second two part operable means connected to the second member, one part of each operable means being fixed relative to the means supporting the second member; means including a universal joint connecting the first member and first operable means for enabling operation of said first operable means solely by rotation about said first axis.

References Cited

UNITED STATES PATENTS

| | | | |
|---|---|---|---|
| 2,398,601 | 4/1946 | Seifert | 244—83 |
| 2,471,821 | 5/1949 | Kutzler et al. | 244—83 |
| 2,991,963 | 7/1961 | Peterson | 244—83 |

ANDREW H. FARRELL, *Primary Examiner.*